US006277340B1

(12) United States Patent
Paikert et al.

(10) Patent No.: US 6,277,340 B1
(45) Date of Patent: Aug. 21, 2001

(54) STRUCTURED PACKING AND ELEMENT THEREFOR

(75) Inventors: Bettina Paikert, Oberrohrdorf; Jonathan Lloyd, Baden; Timothy Albert Griffin, Ennetbaden, all of (CH)

(73) Assignee: ABB Lummus Global, Inc., Bloomfield, NJ (US)

( * ) Notice: Subject to any disclaimer, the term of this patent is extended or adjusted under 35 U.S.C. 154(b) by 0 days.

(21) Appl. No.: 09/002,539

(22) Filed: Jan. 2, 1998

(51) Int. Cl.[7] .................................................. B01J 8/02

(52) U.S. Cl. ...................... 422/211; 202/158; 261/112.2; 422/222

(58) Field of Search .................. 261/DIG. 11, 112.2, 261/113, 94, 111, 155; 422/211, 222, 256; 428/121, 132; 202/158; 366/337

(56) References Cited

U.S. PATENT DOCUMENTS

| | | | |
|---|---|---|---|
| 3,830,684 | * 8/1974 | Hamon | 261/112.2 |
| 3,997,632 | 12/1976 | Kloss | 261/103 |
| 4,107,241 | 8/1978 | Braun | 261/79.2 |
| 4,186,159 | 1/1980 | Huber | 261/112.2 |
| 4,276,242 | 6/1981 | Chen et al. | 261/111 |
| 4,296,050 | 10/1981 | Meier | 261/112.2 |
| 4,307,254 | 12/1981 | Smith, Jr. | 568/697 |
| 4,344,899 | 8/1982 | Monjoie | 261/112.1 |
| 4,356,611 | 11/1982 | Chen et al. | 29/890.07 |
| 4,366,608 | 1/1983 | Nagaoka | 29/890.141 |
| 4,471,014 | 9/1984 | den Hartog et al. | 428/182 |
| 4,497,751 | 2/1985 | Pluss | 261/94 |
| 4,597,916 | 7/1986 | Chen | 261/94 |
| 4,604,247 | 8/1986 | Chen et al. | 261/94 |
| 4,670,196 | 6/1987 | Hsia | 261/112.2 |
| 4,676,934 | 6/1987 | Seah | 261/112.2 |
| 4,731,229 | 3/1988 | Sperandio | 422/188 |
| 5,063,000 | 11/1991 | Mix | 261/94 |
| 5,073,236 | 12/1991 | Gelbein et al. | 203/29 |

(List continued on next page.)

FOREIGN PATENT DOCUMENTS

| | | |
|---|---|---|
| 2032292 | 4/1971 | (DE) . |
| 2060178 | * 11/1971 | (DE) . |
| 2118887 | 10/1972 | (DE) . |
| 2942481 | 4/1981 | (DE) . |
| 2942481 A1 | 4/1981 | (DE) . |
| 3135709 | 4/1983 | (DE) . |
| 3135709 A1 | 4/1983 | (DE) . |
| 0221200 | 5/1987 | (EP) . |
| 750 940 A1 | 1/1997 | (EP) . |
| 70.02980 | 10/1970 | (FR) . |
| 70.46700 | 12/1971 | (FR) . |
| 1226259 | 3/1971 | (GB) . |
| 1341981 | * 12/1973 | (GB) . |
| 1 484 461 | 9/1977 | (GB) . |
| 1554960 | 4/1990 | (SU) . |
| 1554960 A1 | 4/1990 | (SU) . |
| WO 97/02890 | 1/1997 | (WO) . |

*Primary Examiner*—Hien Tran
*Assistant Examiner*—Frederick Varcoe
(74) *Attorney, Agent, or Firm*—Carella Byrne Bain Gilfillan Cecchi; Elliot Olstein; William Squire

(57) ABSTRACT

A low pressure drop, highly efficient structured packing comprises sheet material formed into vertical preferably square channels containing vortex generators formed from the sheet material. The channels, while vertically linear, are periodically interrupted by the vortex generators providing tortuous fluid paths along the channels. The thus formed vortex generators form openings between adjacent channels providing fluid communication between and uniform flow within the different channels. The packing can be utilized in fluid mixing or those operations that require multiphase mass transfer, such as absorption or distillation. The addition of a catalyst makes the structure suitable for catalytic distillation. Turbulence is provided the fluids by the tortuous vertical path with low pressure drops transversely and vertically, with optimum liquid holdup.

13 Claims, 11 Drawing Sheets

U.S. PATENT DOCUMENTS

| | | | |
|---|---|---|---|
| 5,080,962 | 1/1992 | Hench | 428/218 |
| 5,096,663 | 3/1992 | Tatarchuk | 419/11 |
| 5,102,745 * | 4/1992 | Tatarchuk et al. | 428/605 |
| 5,162,288 | 11/1992 | Stringaro | 502/439 |
| 5,188,773 * | 2/1993 | Chen et al. | 261/112.2 |
| 5,189,001 | 2/1993 | Johnson | 502/159 |
| 5,235,102 * | 8/1993 | Palmer et al. | 562/607 |
| 5,304,330 | 4/1994 | Tatarchuk et al. | 419/2 |
| 5,321,163 | 6/1994 | Hickey et al. | 568/59 |
| 5,326,504 | 7/1994 | Gates | 261/112.1 |
| 5,431,890 | 7/1995 | Crossland et al. | 422/211 |
| 5,498,376 | 3/1996 | St. Louis et al. | 261/113 |
| 5,500,160 | 3/1996 | Süess | 261/79.2 |
| 5,523,062 | 6/1996 | Hearn et al. | 422/195 |
| 5,578,254 | 11/1996 | Mix | 261/112.2 |

* cited by examiner

STRUCTURED PACKING AND ELEMENT THEREFOR

The present invention relates to structured packing employed for fluid contacting systems such as a distillate tower or single or multiphase mixers and may be made catalytic for catalytic distillation.

Commercially, distillation is normally practiced as a multistage, counter current gas and liquid operation in a tower containing a packing device to facilitate the gas-liquid contacting that is necessary for both mass and heat transfer. Since multiple equilibrium stages exist in a tower, the compositions of the vapor and the liquid change throughout the tower length. The desired products can be removed as either liquid or vapor at an optimum location in the tower.

The more efficient the mass transfer device, the shorter the tower to achieve the same number of equilibrium stages. The mass transfer devices typically are separated trays which allow vapor to pass upwards through a small height of liquid or continuous packings which contain surfaces for gas-liquid contacting. The ability to approach vapor-liquid equilibrium is either designated by a fractional "tray efficiency" or a "Height Equivalent to a Theoretical Plate" (HETP) for a continuous packing. The lower the HETP, the more efficient the packing. The advantage of structured packings are high efficiency coupled with low vapor pressure drop. Low pressure drops are desired because of the increased cost to force gases upwardly in the tower to overcome high pressure differentials, if present.

Examples of catalytic distribution structures are disclosed in U.S. Pat. No. 4,731,229 to Sperandio, U.S. Pat. No. 5,523,062 to Hearn, U.S. Pat. No. 5,189,001 to Johnson, and U.S. Pat. No. 5,431,890 to Crossland et al. For example, the '229 patent discloses reactor packing elements comprising alternating fluted and unfluted parts with troughs that are inclined relative to the vertical. Apertures are provided in the parts to provide reagent communication flowing through the packing. The troughs are inclined relative to the vertical to ensure optimum fluid contact and to provide liquid holdup, vertical troughs permitting undesirable minimum liquid holdup, i.e., excessive liquid flow.

Catalytic distillation combines the separation (distillation) unit operation with chemical reaction by placing a catalyst inside a distillation column. Since most reaction rates are composition dependent, it is possible to locate the catalyst in an optimal position. Also, in an equilibrium limited chemical reaction, it is possible to remove the product (by distillation) and drive the reaction forward. Most importantly, the use of catalytic distillation allows the use of fewer pieces of equipment. Thus, a prior two vessel reactor and distillation tower arrangement may now be combined into a single structure. U.S. Pat. No. 5,321,163 discloses a catalytic distillation system.

Improved prior art packing structures have been developed comprising composite substrate structures, sometimes referred to as micromesh, which are porous products comprised of fibrous network of material. U.S. Pat. Nos. 5,304,330; 5,080,962; 5,102,745 and 5,096,663, incorporated by reference herein, disclose the production of porous composite substrates comprising fibrous networks of material. A substrate mixture is comprised of typically metallic fibers for forming the porous composite and a structure forming agent which functions as a binder, which are dispersed in an appropriate liquid. After preforming, the liquid is removed and the composite heated to effect sintering of the fibers at junction points to produce a porous substrate composite comprised of a three-dimensional network of fibers. The structure forming agent is removed during or after sintering.

However, the porous material substrate in a packing structure of the type described above does not normally provide for fluid communication through the pores for the gases and liquids in the distillation process to provide for the needed desired contact mixing and desired low pressure drop. This is attributed to possibly capillary action due to the substrate material relatively small pore size. Such material may be for example 100 micron thick sheets (generally about 0.5–0.075 mm thick in one or more layers according to the desired strength) having the stiffness of conventional cardboard material, and sometimes referred to as a "paper," although comprising metal fibers and stronger than paper of cellulose fibers. Such material has a high surface to void volume, comprising approximately 90–95% voids.

The present inventors recognize a need to provide a high efficiency structured packing that results in an improved distillation performance. Advantageously, the present inventors recognize such packing material may be coated with a distillation catalyst for reaction processing of the fluids in a distillation tower.

A structured packing element for a fluid processing and mixing tower defining a vertical axis according to the present invention comprises a sheet material element having a plurality of channels extending in an axial direction parallel to the vertical axis and a plurality of vortex generators in each of the channels forming substantially a tortuous fluid path in each of the channels in the axial direction.

In one aspect, the element has a plurality of apertures therethrough for permitting fluid in each channel to flow transversely the axial direction to and from adjacent channels.

In a further aspect, the sheet material is porous and comprises sintered metallic fibers.

The vortex generators may be triangular, or may have a trapezoidal body segment with a tip segment or may be rectangular wherein the channels are generally square when viewed in a direction along the axial direction.

The channels each may have opposing axially extending lateral side walls extending from an intermediate connecting wall, adjacent channels having a common lateral side wall with the connecting walls of adjacent channels lying in spaced planes to form a quasi-corrugation in a direction transverse the channels, the vortex generators extending from a common lateral wall into next adjacent channels.

A packing structure according to a further aspect of the present invention for a fluid processing and mixing tower defining a vertical axis comprises a plurality of sheet material elements, each element having a plurality of channels for extending in an axial direction parallel to the vertical axis, the elements being secured in abutting side by side relation to form an array of annularly enclosed interior channels and a plurality of axially spaced vortex generators in each of the channels forming solely a tortuous fluid path in each the channels in the axial direction.

In one aspect, the vortex generators each have a portion thereof in overlying relation in the axial direction for substantially blocking linear fluid flow in the axial direction.

In a further aspect, the channels have planar sides normal to an intermediate wall, the vortex generators being integral one piece with the sheet material and forming the apertures.

The vortex generators provide turbulence to maximize two phase fluid contact or maximize mixing of single phase fluids. The vortex generators also provide the desired liquid holdup in vertically oriented channels and provide liquid and gas communication to various portions of a channel and adjacent channels via apertures in the channel wealls to maximize inter fluid contact.

In a further aspect, a packing structure for a fluid processing and mixing tower defining a vertical axis comprises a plurality of porous sheet material elements, each element having a plurality of channels extending in an axial direction parallel to the vertical axis, the material normally precluding fluid communication between adjacent channels regardless the presence of pores in the material, the elements being secured in abutting side by side relation to form an array of annularly enclosed interior channels, the elements having openings therethrough for providing transverse fluid communication among the channels and a plurality of axially spaced vortex generators in each the channels.

Figure 1:
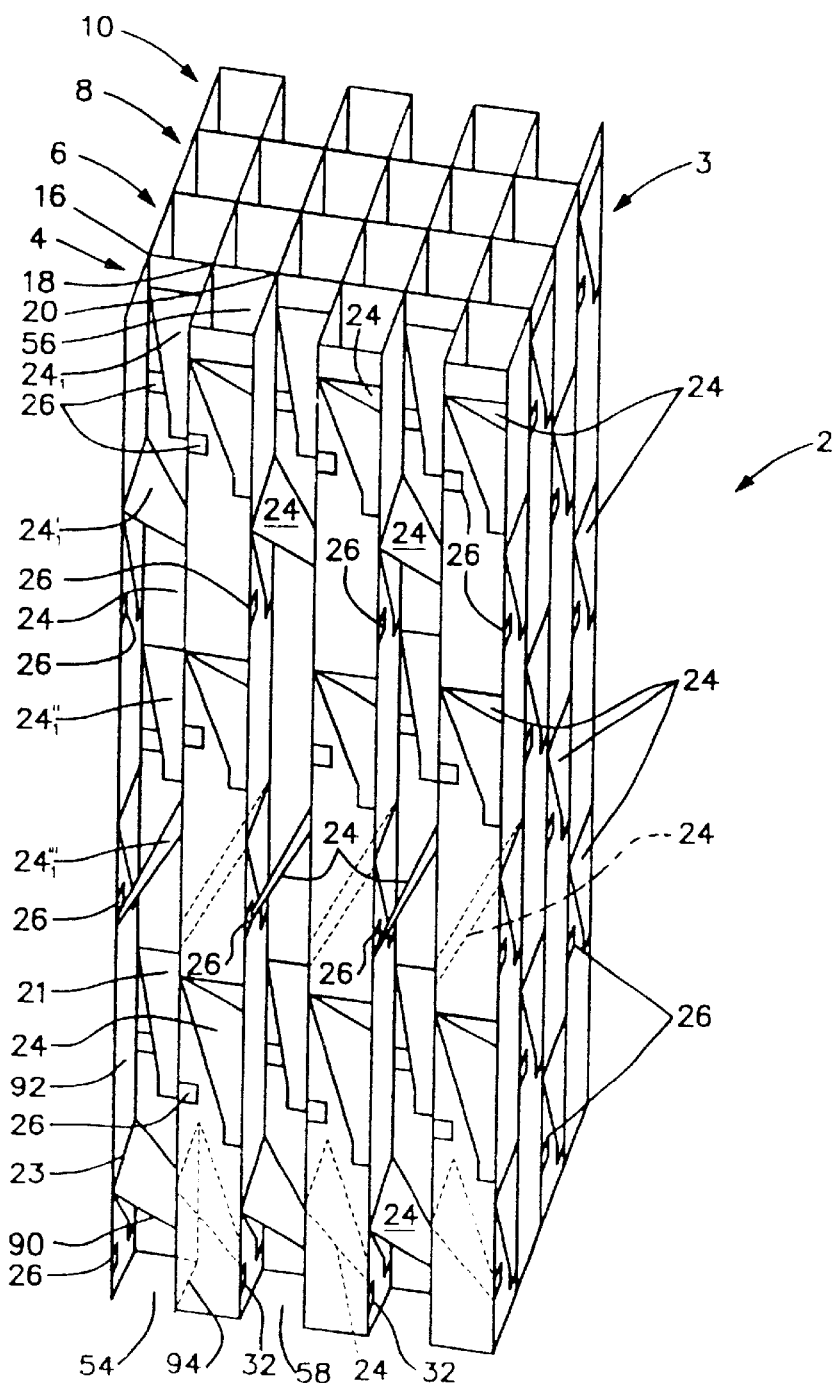
FIG. 1 is an isometric view of a packing structure according to one embodiment of the present invention.
Figure 3:
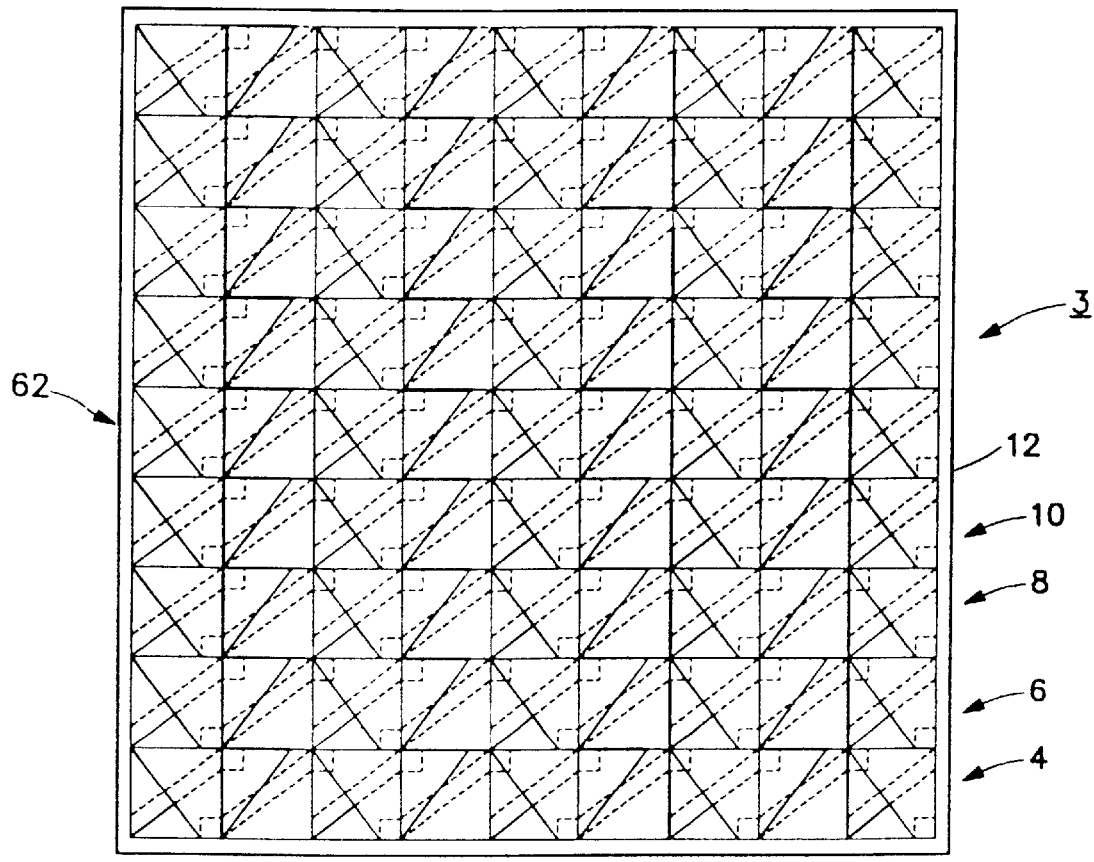
FIG. 3 is a top plan view of the structure of FIG. 1.

In FIG. 1, structured packing 2 comprises an array of identical packing elements 4, 6, 8 and 10 which are part of a larger array 3, FIG. 3. While nine elements are shown in FIG. 3, this is by way of illustration, as in practice more or fewer elements may be used according to a given implementation. Also, the elements are shown in a square array. This configuration is also by way of illustration. In practice, the array may also be rectangular, circular or any other desired shape in plan view, comparable to the view of FIG. 3.

If the array is circular in transverse section, the elements necessarily are not identical in overall transverse width from left to right in FIG. 3. The elements are housed in an outer tower housing 12 (shown in phantom) which in this case is square in transverse section. Other housings (not shown) may be rectangular or circular in transverse section. The elements conform to the housing 12 interior shape to fill the interior volume.

Figure 4:
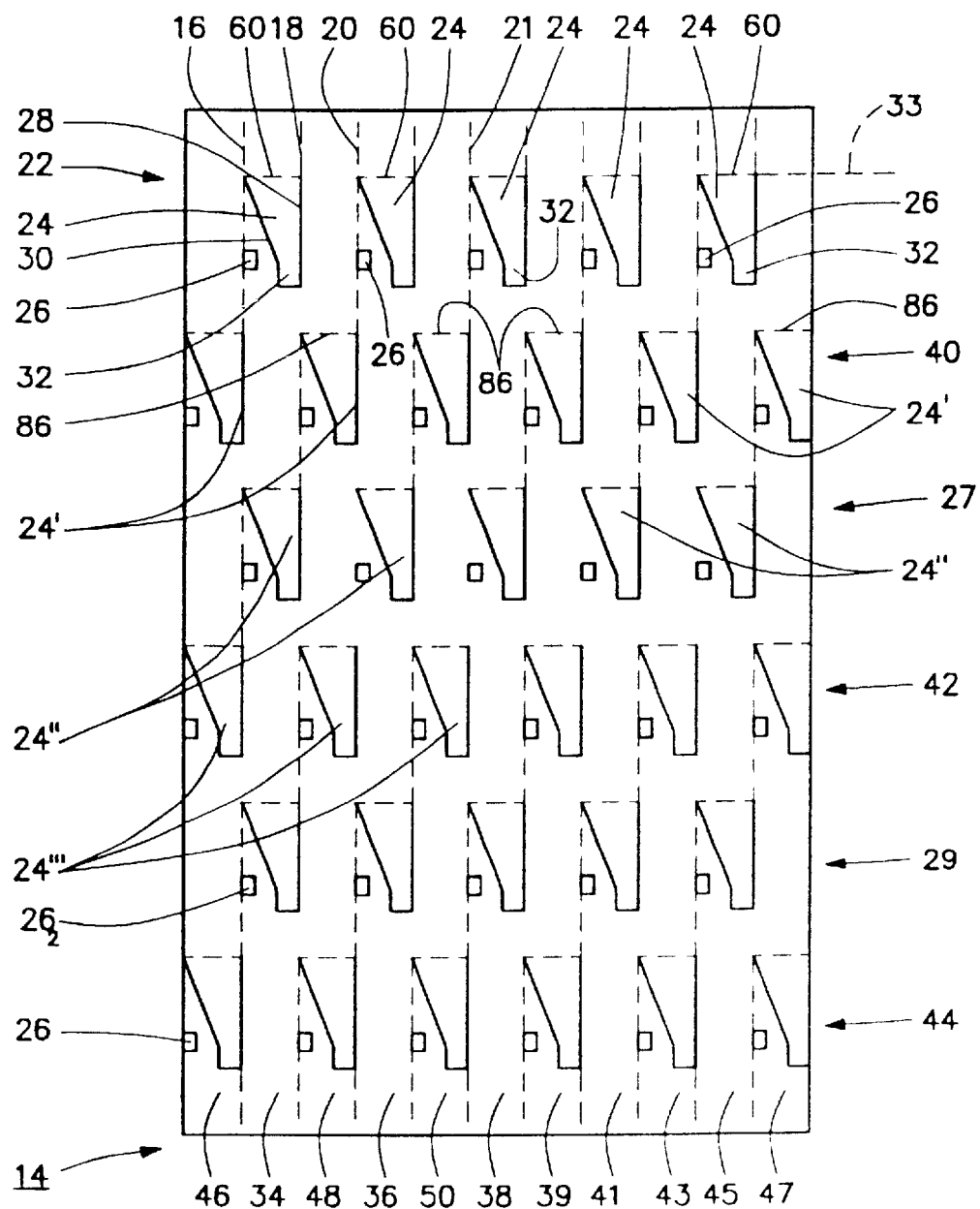
FIG. 4 is a front elevation view of a blank forming a packing element of the structure of FIG. 1.

Each element 4, 6, 8 and 10 is formed from an identical substrate blank 14, FIG. 4, of preferably composite porous metallic fibers as described in the introductory portion. The material is preferably formed from the material as described in the U.S. patents noted in the introductory portion and which are incorporated by reference herein.

The material of the elements may also be solid sheet metal or other materials as known to those of skill in this art. The blank 14 is a fragment of and represents a portion of a larger complete blank forming each of the elements of FIG. 3. The complete blank (not shown) appears as shown for the partial blank 14 with an identical repetition of the illustrated pattern extending to the right in the Figure (and according to a given implementation, may extend further vertically from the top to bottom of the figure).

In FIG. 4, the substrate blank 14 includes a plurality of through cuts represented by solid lines. Fold lines are illustrated by broken lines 16, 18, 20, 60 and so on. A first row 22 of identical tabs 24 and identical through holes 26 are formed with a tab 24 and hole 26 disposed between each of alternating pairs of adjacent fold lines, such as lines 16 and 18, 20 and 21 and so on. Tabs 24 eventually form vortex generators as will be described below herein. The holes 26 are adjacent the tip region of the tabs 24 and are located on a channel forming fold line at which the inclined edge 30 emanates. Reference numerals with primes and multiple primes in the figures represent identical parts.

Each tab 24 has a first edge 28 coextensive with a channel forming fold line, such as line 18. The tab 24 has a second edge 30 which emanates at a second channel fold line such as fold line 16 inclined to the fold lines 16 and 18 terminating at a distal end segment tip 32. The edges 28 and 30 terminate at one end at tab fold line 60 along plane 33. The tip 32 has an edge that is coextensive with edge 28 both of which edges are straight and lie on a channel fold line, such as line 18.

The edges 28 and 30 both emanate from a common transverse plane 33 as do all of the edges of the tabs 24 of row 22. The tip 32, which is optional, preferably is square or rectangular for the purpose to be described, but may be other shapes as well according to a given implementation. Holes 26 are slightly larger than the tip 32 so as to permit a tip 32 of a tab 24 to pass therethrough in a manner to be explained. All of the tabs 24 and holes of row 22 are aligned parallel to plane 33.

Additional rows 27 and 29 of tabs 24 and holes 26 are aligned parallel to row 22 and are aligned in the same column such as column 34 between a given set of fold lines such as lines 16 and 18. The tabs 24 and holes 26 between fold lines 16 and 18 are aligned in column 34. The blank 14 as shown has alternating columns 36, 38 and so on corresponding to column 34 of tabs 24 and holes 26 which are aligned in the respective rows 27 and 29. More or fewer such rows and columns may be provided according to a given implementation.

The rows 22, 27 and 29 alternate with rows 40, 42 and 44 of tabs 24 and holes 26. The tabs 24 and holes 26 of rows 40, 42 and 44 are in the alternate columns 46, 48, 50 and so on. Consequently, the blank 14 has a plurality of rows and columns of the tabs 24 and holes 26 with the tabs of a given set of columns and rows alternating in vertical and horizontal position with the tabs and holes of the remaining columns and rows as shown.

Figure 2A:
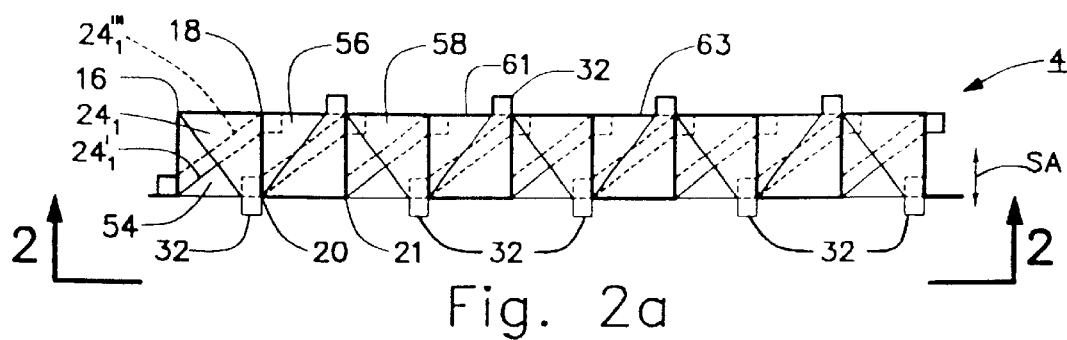
FIG. 2a is a top plan view of one of the packing elements of FIG. 1.
Figure 2:
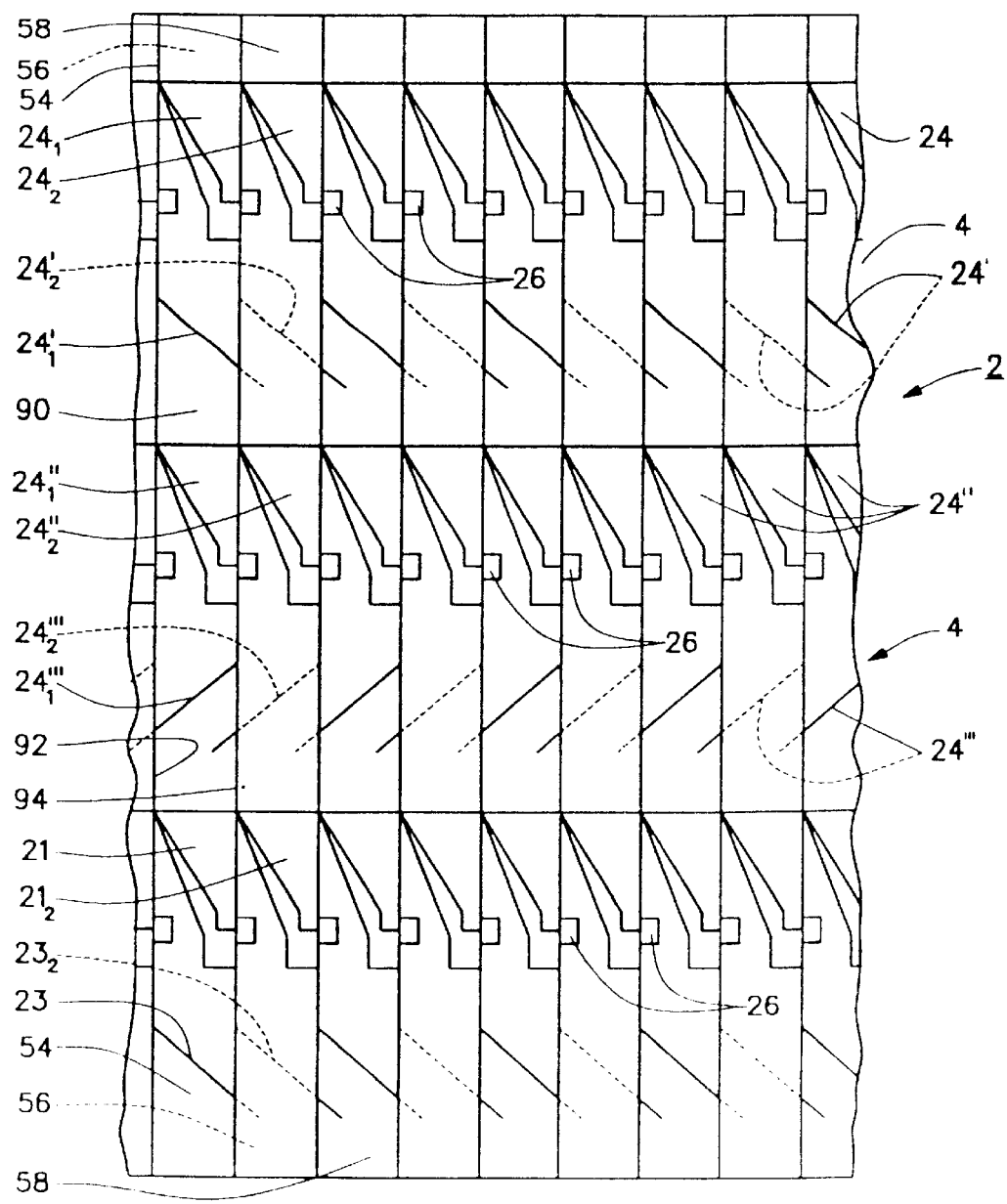
FIG. 2 is a front elevation view of the packing element of FIG. 2a taken along lines 2–2.

In FIGS. 2 and 2a, the element 4, as are all of the elements, is formed by bending the blank substrate material along the fold lines 16, 18, 20, 21 and so on (FIG. 4) in alternating opposite directions. This forms the blank 14 into a channelized quasi-corrugated structure. The structure has identical preferably square in plan view channels 54, 56, 58 and so on. These channels face in alternating opposite directions 59. Thus channels 54, 58 and so on face toward the bottom of the figure, directions 59 and channels 56, 61, 63 and so on face in the opposite direction toward the top of the figure.

Figure 3A:
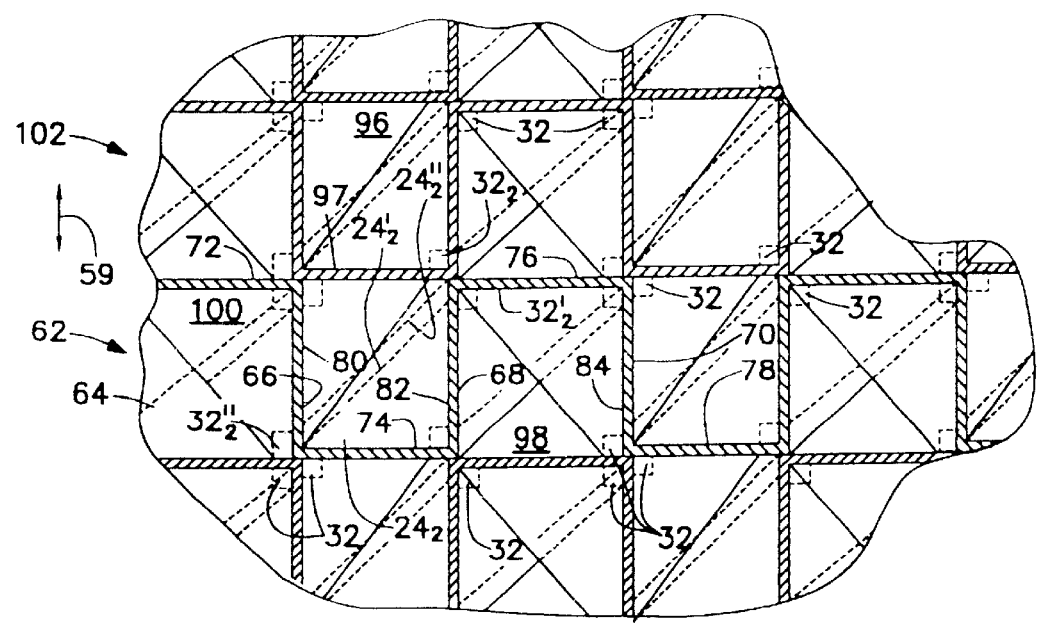
FIG. 3a is a more detailed view of a portion of the structure of FIG. 3.

In FIG. 3a, representative element 62 has channels 64, 66, 68, 70 each having a respective intermediate connecting wall 72, 74, 76 and 78 and so on lying in planes extending from left to right in the figure spaced in a nortrmal direction. Channel 66 has lateral side walls 80 and 82 and channel 68 has lateral side walls 82 and 84 with wall 82 being in common for channels 66 and 68. The element 62 has further identical channels as seen in FIG. 3. All of the elements of packing 2 are constructed similarly with identical channels.

Prior to forming the channels or at the same time, the tabs 24, FIG. 4, are bent to extend from the plane of the blank 14 to form vortex generators at collinizar fold lines 60 lying on plane 33.

The tabs 24 in row 22 are bent out of the plane of the figure in opposite directions in alternate columns 34, 36, 38 and so on. Thus the tabs of columns 34,. 38, and 45 are bent in the same direction, e.g., out of the drawing plane toward the viewer. The tabs in columns 36 and 41 are bent in the opposite direction out of the plane of the figure away from the viewer. The same bending sequence is provided the tabs of rows 27 and 29 which are in the same columns as the tabs of row 22 so that the tabs of a given column are all bent in parallel directions.

The tabs 24' of the next row 40 in the adjacent alternate columns 46, 48, 50 and so on are all bent parallel in the same direction at corresponding collinear fold lines 86 parallel to plane 33 toward the viewer. They are also parallel to the tabs of columns 34, 38 and so on.

The tabs 24" of the next row 27 are bent at their respective fold lines in the same direction as the tabs 24' in row 27, e.g., toward the viewer out, of the plane of the drawing. These tabs are parallel to the tabs of row 40.

The tabs 24''' of the row 42 are bent at their fold lines 88 in a direction opposite to the bend of the tabs of rows 27 and 40, e.g., in a direction out of the plane of the drawing away from the viewer. These tabs are parallel and bent in the same direction as the tabs in columns 36 and 41. The tabs of row 29 are bent in the same direction as the tabs of rows 22 and 27 in the same columns, repeating such bends. The tabs of row 44 are bent the same as the tabs of rows 42 and 40 toward the viewer.

In FIGS. 1 and 2, element 4 has a set of tabs $24_1$, $24_1'$, $24_1''$, $24_1'''$, 21 and 23 in channel 54. The tabs $24_1$, $24_1''$, and 21 all extend in the same direction, for example, from channel 54 connecting wall 90 into the channel 54. The tabs $24_1'$, and 23 extend from the same lateral side wall, e.g., side wall 92. The tab $24_1'''$, however, extends into channel 54 from the opposite lateral side wall 94. The tabs in plan view along the channel 54 length, from the top of the figure to the bottom, in FIGS. 1 and 2, interrupt the vertical channels and thus form a solely tortuous generally vertical path for fluids. No open continuous vertical linear fluid path is available along the channel lengths for any of the channels.

The tabs in the next opposite facing channel 56 are in mirror image orientation to the tabs of channel 54 as best seen in FIG. 2.

The tortuous blocking interruption of the vertical linear path by the tabs is best seen in FIG. 3a. Representative element 62 channel 66 has an uppermost tab $24_2$, a next lower tab $24_2$' and then a still next lower tab $24_2$" and so on. As shown, a portion of each of the tabs overlies a portion of the other tabs in the channel. In the plan view the channel 66 is totally blocked by the tabs, as are all of the channels, in the vertical direction normal to the plane of the figure. Thus no linear vertical fluid path is present along the length of the channel 66 (or channels 54, 56, 58 and so on in FIG. 2). Also, each tab in a given channel has one edge thereof adjacent to and abutting either a lateral side wall or a connecting wall.

The holes 26 each receive a tip 32 of a corresponding tab. For example, in FIG. 3a, a tip $32_2$ of tab $24_2$ extends through a hole 26 into adjacent channel 96 of an adjacent element 102. A tip $32_2'$ of tab $24_2$ ' extends into adjacent channel 98 of element 62. A tip $32_2''$ of tab $24_2''$ extends into adjacent channel 100 of element 62. The tab tips thus extend through the corresponding holes 26 of the channel thereof into a next adjacent channel for all of the tabs.

The tabs extending from an intermediate connecting wall, such as tab $24_2$, FIG. 3a, attached to wall 74 of element 62, extend toward and pass through the hole 26 of the connecting wall of the adjacent packing element, such as wall 97 of element 102. However, none of the tabs of element 102 extend into or toward the channels of the element 62. Thus, the tabs of each element are employed for substantially cooperating with only the channels of that element to provide the desired tortuous fluid paths. The tabs of each element are substantially independent of the channels of the adjacent elements, notwithstanding that the tips 32 of the connecting wall tabs cooperate as described with the connecting walls and channels of the adjacent elements.

The tabs 24 and tips 32 are not bent away from the plane of the blank 14, FIG. 4 for those walls of the channels next adjacent to the housing, which walls abut the housing 12. Thus the tabs at the edges of the structure array 3, FIG. 3, do not extend beyond the structure so as to not interfere with the housing 12 interior walls. In the same manner, the tabs at the edge surfaces of the structure 3 are not bent beyond the plane of these surfaces as shown in FIG. 3. Holes 26 in these edge surfaces are also not necessary.

The tips 32 and holes 26 are employed to provide drip flow of liquid to opposite sides of the respective channel walls to enhance fluid contact throughout the packing structure. The holes 26 also provide fluid communication among the channels in directions transverse the vertical axis of the structure array 3. Of course, the openings in the structured elements sheet material formed by bending the tabs out of the plane of the sheet material provide major fluid communication between the channels in a transverse direction. These openings and openings 26 are formed in all four walls of each interior channel.

The elements of structure array 3, FIG. 3, such as elements 4, 6, 8, 10 and so on, are preferably secured together by spot welding the corners of the channels at the upper and bottom array 3 ends. The welding is optional as the elements may be dimensioned to fit closely into the tower housing 12 (FIG. 3) and held in place to the housing by friction or by other means (not shown) such as fasteners or the like. The elements may also be secured together first by any convenient fastening devices or bonding medium.

It should be understood that the number of tabs in a channel and their relative orientation is given by way of example. For example, only one tab, such as tab $24_1'''$ in channel 54 extends from the lateral side wall 94 into channel 54. In practice, more than one tab would extend from each side wall into each channel. Also, the sequence of tab orientation, e.g., which tabs extend from a given wall in a vertical sequence, is also by way of example, as other orientations may be used according to a given need.

Further, the vertical length of the elements and the packing array channels of the array 3 in practice may vary from that shown. The channel lengths are determined by the factors involved for a given implementation as determined by the type of fluids, volumes thereof, flow rates, viscosities and other related parameters required to perform the desired process.

In operation, the structured packing 2, FIG. 1, may be used in a distillation process, with or without a catalyst or in a single stage or two stage mixing process. In addition, the packing may be used for liquid-vapor contact providing high specific surface area (area per unit volume), relatively uniform distribution of vapor and liquid throughout the column, and uniform wetting of the involved surfaces. The preferred microporous substrate material forming the structure provides enhanced wetting of the packing surface through its surface texture for catalytic applications. In the alternative, the catalyst is attached to the solid sheet material forming the structure.

The preferred micro mesh material provided by the sintered fiber sheet material of the packing elements provides relatively high catalyst surface area with optimum access to the catalyst by the fluids. The fibers are either coated with the catalyst or support the catalyst particles trapped in the porous network of the sheet material. Where relatively rapid chemical reactions are desired, utilization of the internal surface area of the porous material is dependent upon the rate of transport of the reactants to these surfaces. The mass transport is higher in the case of driven forced flow (convection) than by mere concentration of gradients (diffusion). The structure therefore provides optimum cross flow of the fluids with low pressure drop thereacross.

To maximize capacity, the pressure drop is maintained relatively low. This is provided by relatively high void space per unit column volume, low friction (good aerodynamic characteristics) and prevention of undesirable stagnant liquid pockets.

In a catalytic distillation process, a catalyst is secured to the sheet material forming the elements as discussed above. The catalyst may impregnate the voids of the element sheet material or may be external thereto. In a distillation process, liquid permeates downward through the packing while gas to be mixed with the liquid rises.

The rising gas exhibits turbulence due to the presence of the tabs which act as vortex generators and due to the openings between the channels. The gas flows into the different channels via the holes 26 and via the openings formed by the bending of the tabs 24 from the plane of the sheet material substrate. As the gas rises it can only traverse a tortuous vertical path in each channel as no direct vertical linear path is available due to overlapping portions of the vortex generating tabs. This enhances contact of the gas and liquid (two phase) or multiple gases or liquids in a single phase.

It can be shown that the vertical channel orientation provides improved low pressure drop with optimum liquid hold up. The resulting turbulence generated by the vortex generators contributes to the liquid hold up. Vertical channels have the advantage of low pressure drop, but normally also exhibit poor mixing and gas-liquid mass transfer. However, the vortex generators and openings between elements of the structure of the present invention allow the use of essentially straight vertical channels. The resulting structured packing of the present invention exhibits the low pressure drop of vertical linear channels, and at the same time also exhibits superior mixing and mass transfer characteristics due to the tortuous fluid paths.

Also, the vortex generators tabs 24 serve as drip points for the liquid to distribute fluid from one side of a channel to the other. The tips 32 serve to enhance liquid dripping into adjacent channels and along the opposing walls of a channel. Also, the tips engage the corresponding channel sides to resist vibrations and provide further stability.

Liquid flows through the holes 26 to the adjacent channels and the liquid contacts the opposite side walls of a channel and flows down those walls also as it flows down the inclined tabs. The holes 26 provide pressure equalization and communication from one channel to the next and create a tortuous path for the fluids whether gas or liquid.

The preferably square or optionally rectangular shape of the vertically oriented channels provides more surface area as compared to prior art inclined corrugated triangular channels. The channels may also have various geometries, such as round, triangular, or other polygons in transverse section. For example, the channels transverse section may be hexagonal or other regular or irregular shapes according to a given implementation.

In a bubble regime, liquid is carried from channel to channel with bubbles, providing enhanced liquid distribution. In this case, linked channels may be optional. Also, relatively smaller and more numerous vortex generators may also be employed. The tips 32, FIGS. 1–4 also may act as vortex generators.

Vapor is distributed through the openings in the channel walls while liquid is distributed by flowing over the tabs into the adjacent channels. The tabs 24 also interrupt the liquid as it flows providing relatively constant liquid film renewal and therefore good mixing in the liquid phase. The tabs 24 prevent concentration of liquid in the corners of the channels by diversion of the liquid, i.e., minimizes gutter flow. Further, reorientation of the packing elements by 90° as done with angled channels is not necessary with vertical channels.

The number of vortex generators can differ from top to bottom of the structure. Thus a greater number of vortex generators may be placed closer to the structure top for enhanced liquid distribution. Fewer vortex generators may be placed closer to the structure bottom to reduce overall pressure drop. Sandwiched designs malt also be used. These designs comprise axially segmented packing elements performing different functions. For example, the mixing or liquid distribution can be provided at one packing segment and chemical reaction can be provided at a different axially disposed packing segment.

An important aspect is that very little material of the substrate is lost since the tabs that are utilized in the structure also provide fluid cross communication openings in the channel sidewalls. The holes 26, which are optional, and are not essential, especially for relatively large pore substrate material, represent a minor loss of material which is relatively costly.

Further, a relative large amount of drip points are provided to maximize liquid-gas mass transfer and mixing. Optimum side wall pressures can be provided by selection of the side wall positions of the tabs, i.e., by having an edge adjacent to a channel side wall or by positioning the tabs in optimum relative vertical positions.

The vortex generators may of any shape, but preferably are triangular. They may be, for example, rectangular or round e.g., semicircular, according to a given implementation. They may also contain a trapezoidal segment as described. The vortex generators each contain a portion that substantially interrupts and redirects fluid flow in the axial vertical direction providing the desired vertically extending tortuous path.

The vortex generators provide turbulence to maximize two phase mass transfer or mixing of single phase fluids. By directing liquid into the middle of a channel, the vortex generators also maximize two-phase contact area in the vertical channels. The transverse openings between channels made by the vortex generators also provide liquid and gas communication to various portions of each channel and adjacent channels.

By way of example, the channels in one embodiment may be 12 mm in transverse dimension in a square channel. The channels and packing vertical length may be 210 mm in that embodiment employing eight vortex generators in a channel. Smaller or larger channels. Their length and the number of generators is determined according to a given implementation.

Figure 5:
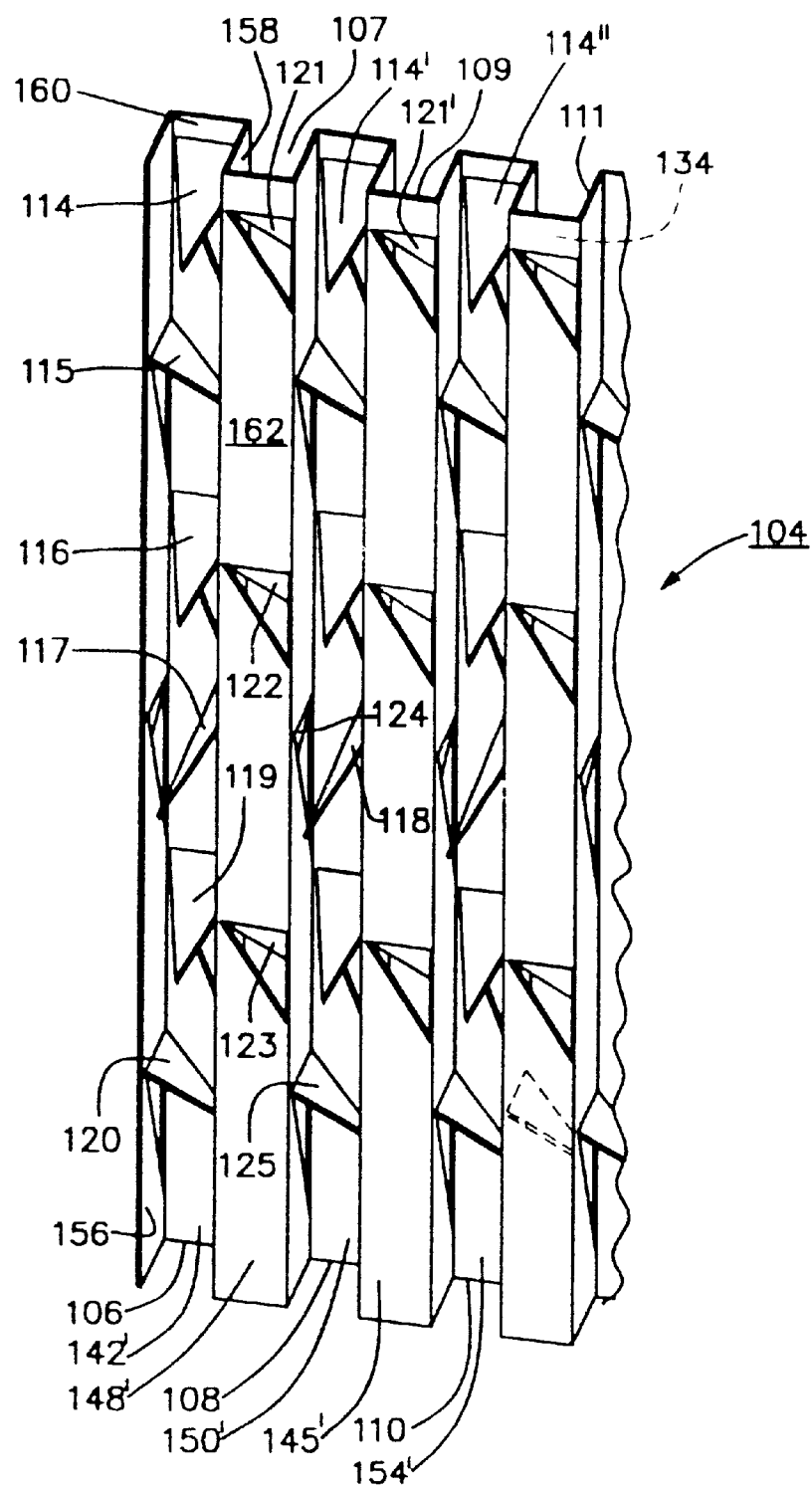
FIG. 5 is an isometric view of a packing element of a second embodiment of the present invention.
Figure 6A:
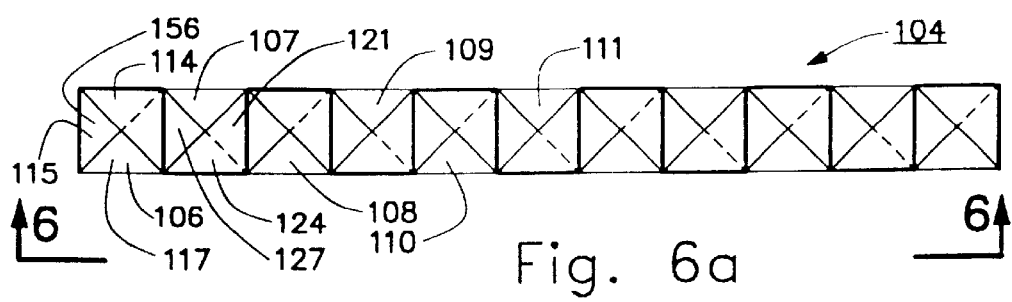
FIG. 6a is a top plan view of the element of FIG. 5.
Figure 6:
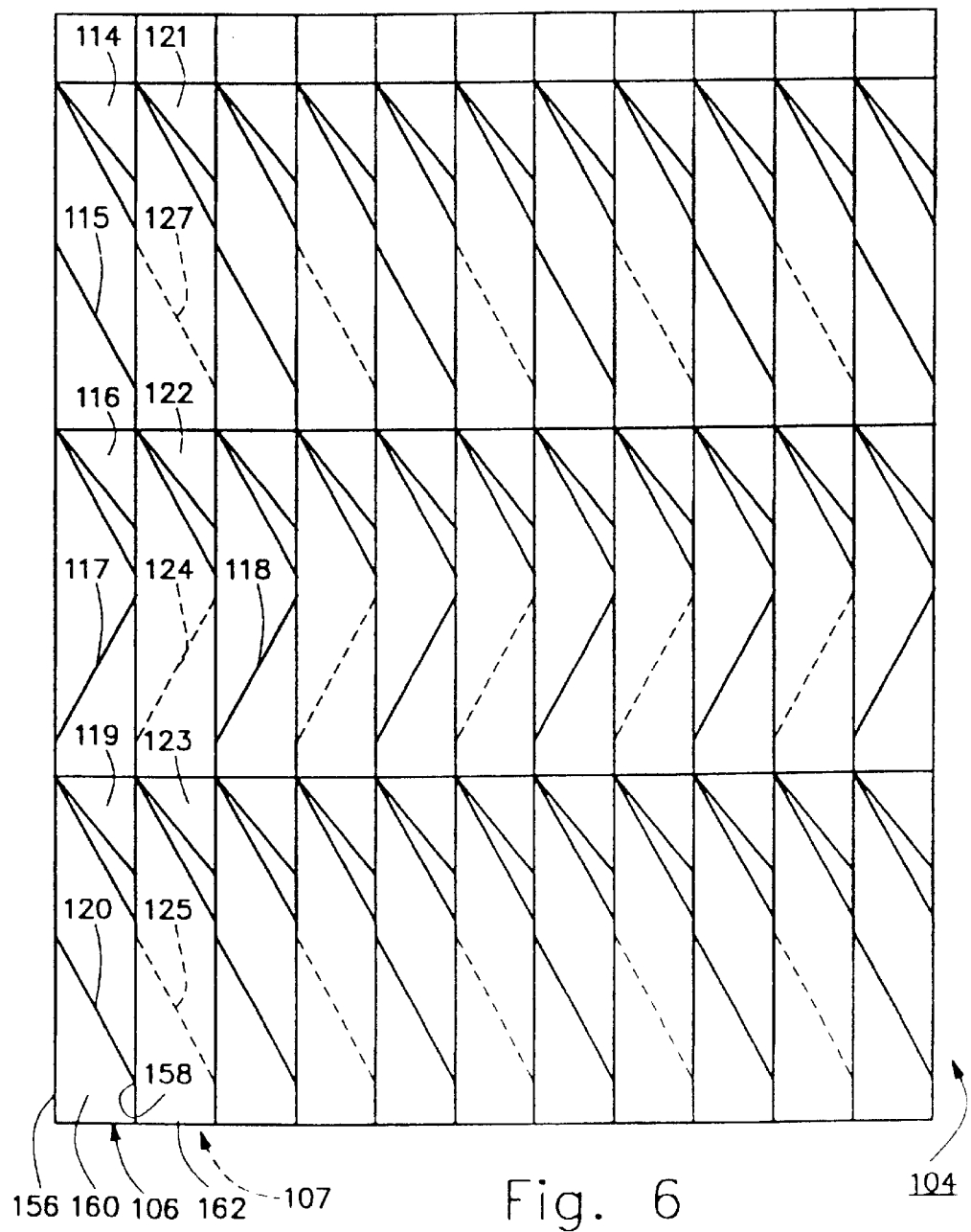
FIG. 6 is a front elevation view of the element of FIG. 6a taken along lines 6—6.

In FIGS. 5–9, an alternate embodiment of a packing structure and element therefor is shown. In FIGS. 5 and 6, element 104 comprises porous substrate material of the same porous metal fiber construction as the material of the elements of FIG. 1 and as described in the introductory portion. It should be understood that the porosity of the substrate is not illustrated in the Figures and that the drawings in relation to various dimensions is not to scale for purposes of illustration. The sheet material thickness and fiber diameters being in the order of microns as discussed above.

The element 104, which is a fragment of a larger element in the drawing, in practice extends both horizontally and vertically beyond what is shown, comprises a plurality of square in transverse section channels 106–110 and so on. The element 104 in use is oriented with the channels vertical in a processing tower (not shown). A plurality of vortex generating triangular tabs 114–126 and so on are formed from the sheet material substrate and extend completely across the corresponding channel in which they are located. The tips of the tabs may abut or be closely spaced from the opposite channel lateral side wall or intermediate connecting wall as applicable.

Figure 8:
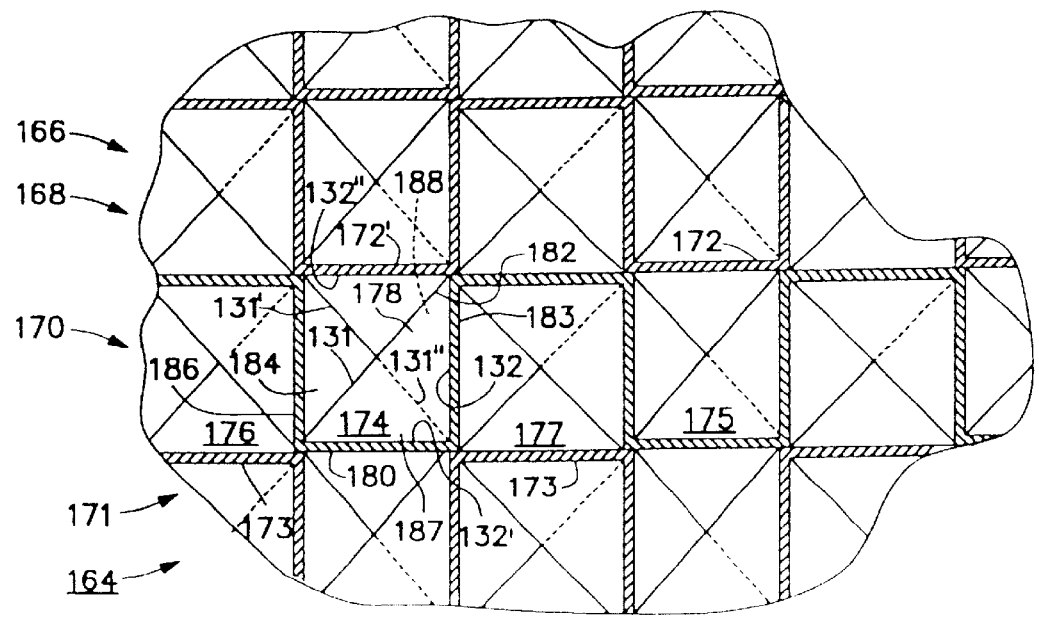
FIG. 8 is a more detailed plan view of a portion of the structure of FIG. 7.
Figure 7:
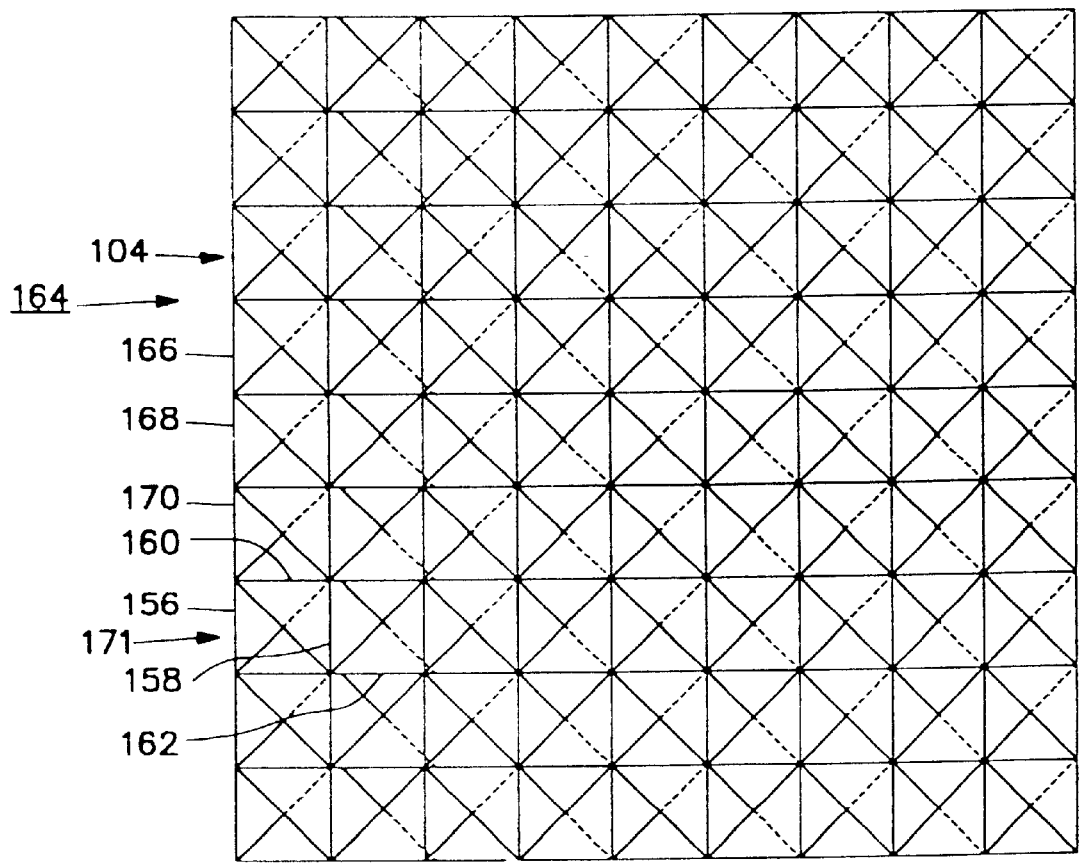
FIG. 7 is a top plan view of a packing structure employing a plurality of elements of FIGS. 5 and 6.

In the case of the tabs extending from a connecting intermediate wall, these tabs abut or are closely spaced to the connecting intermediate wall of the next adjacent packing element as shown in FIGS. 7 and 8 to be described. This is so that liquid drips along a tab onto that opposite channel side wall and then along that wall. The tab tips need only be sufficiently close to the opposite wall so that flowing liquid on that tab drips the liquid onto that wall.

Figure 9:
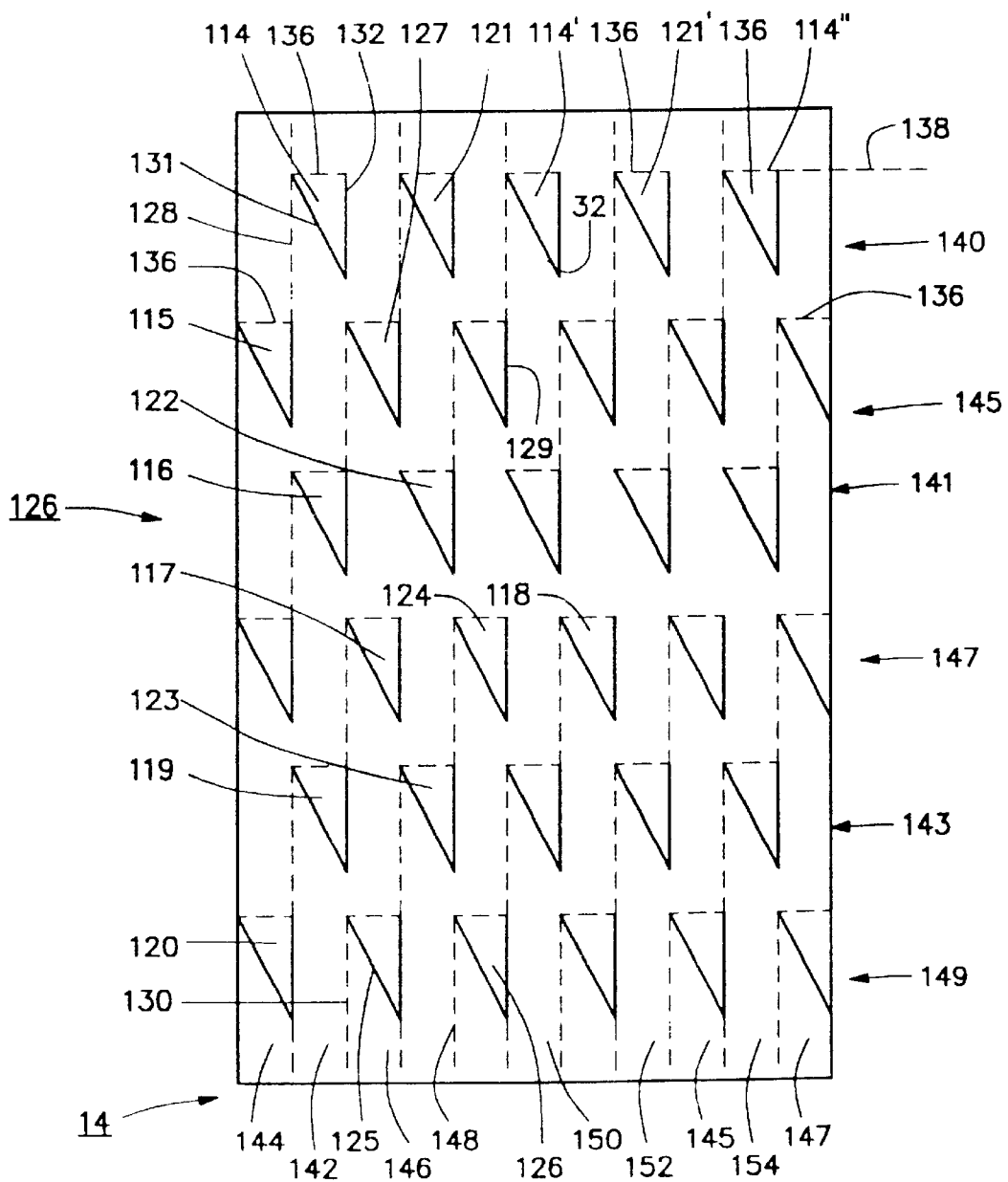
FIG. 9 is a front elevation view of the blank used to form the element of FIG. 5.

The element 104 is formed from a substrate sheet material of preferably porous sintered metal fiber blank 126, FIG. 9. The blank 126 preferably comprises the same sintered porous fibrous material described above. The blank is a planar sheet wherein solid lines represent through cuts and dashed lines represent fold lines. Fold lines 128, 130, 132 and so on form the channels 106–110 when the substrate 134 is bent at right angles at the fold lines. Fold lines 136 are aligned in linear rows normal to the channel fold lines 128 and so on in parallel planes such as plane 138. The tabs each correspond to and are bent at a fold line 136 out of the plane of the blank.

Each tab, e.g., tab 114, has a first edge 131 inclined to and emanating from a vertical fold line, e.g., line 128, and a horizontal fold line, e.g., line 136, and has its tip terminating at the next adjacent vertical fold line of that column, e.g., line 130. Each tab, e.g., tab 114, has a second edge which emanates from a horizontal fold line, e.g., line 136, and is vertically coextensive with the next adjacent fold line of that column, e.g., fold line 130.

The tabs are aligned in vertical columns 142, 144, 146, 147, 148, 150, 152 and 154 and so on and in horizontal rows 140, 141, 143, 145, 146 and 149 and so on. The tabs in adjacent rows, such as rows 140 and 145, are in alternate columns. The tabs in row 140 are in respective columns 142, 148 and the tabs in row 145 are in columns 144, 146 and so on.

Alternate tabs in top row 140 are bent in the same direction. For example tabs, such as tabs 114, 114' and 114", in row 140 and located in columns 142, 150, and 154 are bent in the same direction toward the viewer out of the plane of the drawing. The columns 142, 150 and 154 form the respective connecting walls 142', 150' and 154', FIG. 5, and the columns 148, 145 form the respective connecting walls 148', 145.

In FIG. 5, the tabs 114, 114' and 114" each extend parallel into the corresponding channel 106, 108 and 110 respectively from their corresponding channel connecting walls.

The other alternate tabs, FIG. 9, in row 140, e.g., tabs 121, 121' in respective columns 148 and 152, are bent in the opposite direction away from the viewer out of the plane of the drawing. These are connected to connecting walls 148' and 152', FIG. 5. These tabs are bent into the corresponding channels 107 and 109 which face in opposite directions as channels 106, 108 and 110 in which tabs 114, 114' and 114" extend.

The tabs in alternate rows in each column, e.g., rows 141 and 143, are bent in the same direction and parallel to the tabs of row 140. That is, tab 116 is bent parallel to tab 114 and tab 122 in the next alternate column 148 is bent parallel to tab 121, the tabs in columns 142, 150 and 154 being bent in opposite directions as the tabs in columns 148, 145 and so on. This pattern of bends repeats for the remaining columns for the tabs in the rows 140, 141 and 143.

The tabs of row 145, tabs 115, 127 and so on, and row 147, tabs 118, 117 and 124 and so on, are all bent in parallel in the same direction from the plane of the substrate material, i.e., toward the viewer out of the plane of the drawing figure, FIG. 9.

The tabs of row 147, e.g., tabs 118, 117, 124 and so on are bent in the same direction as the tabs 121, 122 and 123 of column 148 and the tabs of column 152. These are bent in a direction away from the viewer out of the plane of the drawing figure. While only one row of tabs, row 149 are bent in this opposite direction in the corresponding columns, more such tabs are preferably provided, e.g., by making the element 126 longer or rearranging the tab orientation of the other tabs in each channel.

In FIG. 5, tabs 114, 115, 116, 117 and 120 all are in channel 142'. Tab 118 is located in channel 150'. Tabs 115, 117 and 120 emanate from the same channel lateral side wall 156. Tab 117 emanates from the opposite side wall 158. The remaining tabs of channel 106 emanate from connecting wall 160.

The above pattern of tabs repeats for each of the remaining channels, with the tabs 121, 122 and 123 emanating from the connecting wall 162 of opposite facing channel 107.

In FIGS. 7 and 8, packing structure 164 comprises a plurality of elements 166, 168, 170 and so on identical to element 104 arranged in a square array. The array could be other shapes such as rectangular or circular according to a given need. In FIG. 8, the connecting walls 172 of element 168 enclose the channels 174–175 and so on of element 170 and walls 173 of element 171 enclose channels 176 and 177. In this way all of the interior channels are enclosed by connecting walls of the next adjacent element. The elements of the structure 164 are attached to each other as described above for the embodiment of FIG. 1.

In FIG. 8, uppermost tab 178 (corresponding to tab 121, FIGS. 6 and 6a, for example) of element 170 in channel 174 depends from connecting wall 180. Tab edge 131 extends diagonally across the channel 174 from corner to corner tab edge 132 is next adjacent lateral side wall 183. The tab 178 tip 182 is next adjacent to the opposite connecting wall 172' of element 168.

The next lower tab 184 (corresponding to tab 127, FIG. 6) depends from side wall 186. Its inclined edge 131' extends from lateral side wall 186 to wall 183. Its other edge 132' is next adjacent to connecting wall 180. Edges 132 and 132' may abut or be closely spaced to the adjacent corresponding wall for permitting liquid flowing on the tabs to flow onto that wall. The tab 184 tip 187 is at the corner junction of walls 180 and 183. Liquid flowing to the tip thus flows to that corner on the opposite side of the channel from wall 186. The edges 131 and 131' may overlie one another or slightly overlap the next adjacent tab body.

The next lower tab, tab 188, depends from wall 183 and is beneath tab 184. Tab 188 has an inclined edge 131" extending overlying edge 131'. Tab 188 has the opposite edge 132" abutting or closely spaced to connecting wall 172' of element 168.

As a result, the tabs 178, 184 arid 188 completely block the channel 174 in the vertical direction, providing a tortuous fluid path in the vertical direction. A gas flowing vertically upwardly in the channel 174 must flow past and about the inclined edges 131, 131' and 131" of the respective tabs. The remaining tabs in that channel provide a similar tortuous path for fluids attempting to flow in a vertical direction. No linear vertical path is provided for the fluids. The tabs serve as vortex generators maximizing mixing and contact of the flowing fluids. Liquids flowing downwardly flow along the channel sides and along the tabs and are distributed to the various opposite channel side walls.

The tabs by being bent from a plane sheet substrate, form large openings in the substrate. These openings form cross communicating paths for fluids to flow to the channels of the adjacent elements. This minimizes the pressure drop transversely the channels, and the vertical tortuous path minimizes the pressure drop in the vertical directions. Turbulence is created by the tabs in each channel and in cooperation with the openings in the channel walls. The inclined tabs provide optimum liquid holdup as the liquid flows downwardly.

It will be appreciated that in place of triangular tabs, the tabs can be trapezoidal somewhat similar to the tabs of FIG. 1, but without the extended tips 32. In this way the inclined edges are not aligned vertically, but spaced transversely according to the amount that the tip of the tab is truncated. This provides further overlap of the vertically spaced tabs in a channel to provide increased turbulence by increasing the tortuous nature of the vertical path past the tab edges in a channel.

Figure 10:
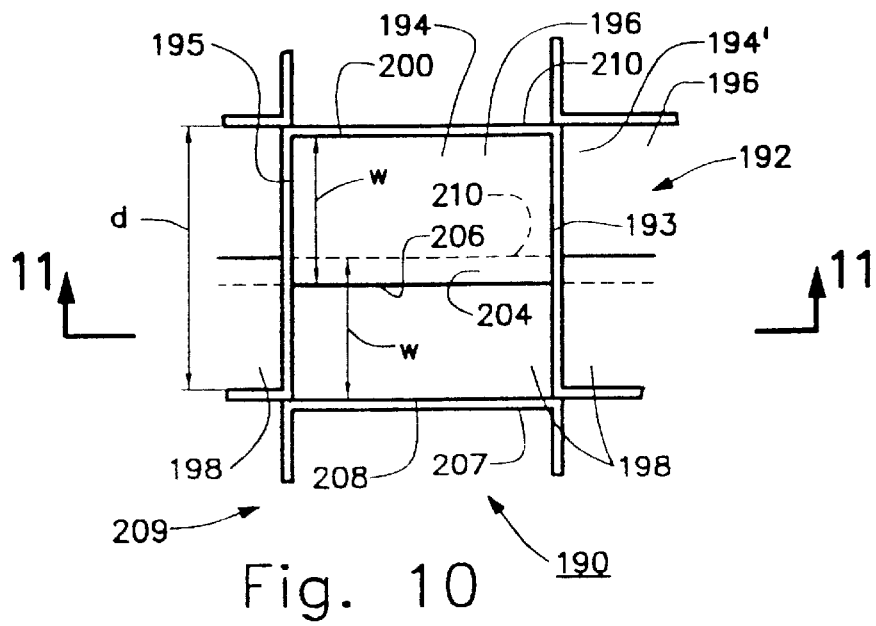
FIG. 10 is a plan view of a portion of a packing structure according to a further embodiment of the present invention.
Figure 11:
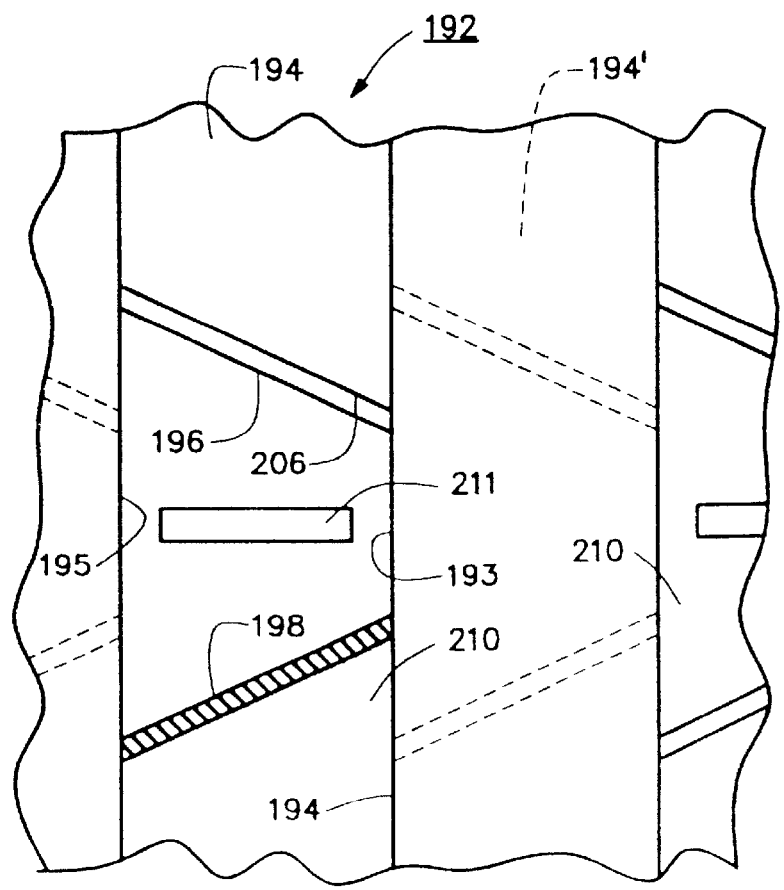
FIG. 11 is a fragmentary side elevation view of the embodiment of FIG. 10 taken along lines 11—11.
Figure 12:
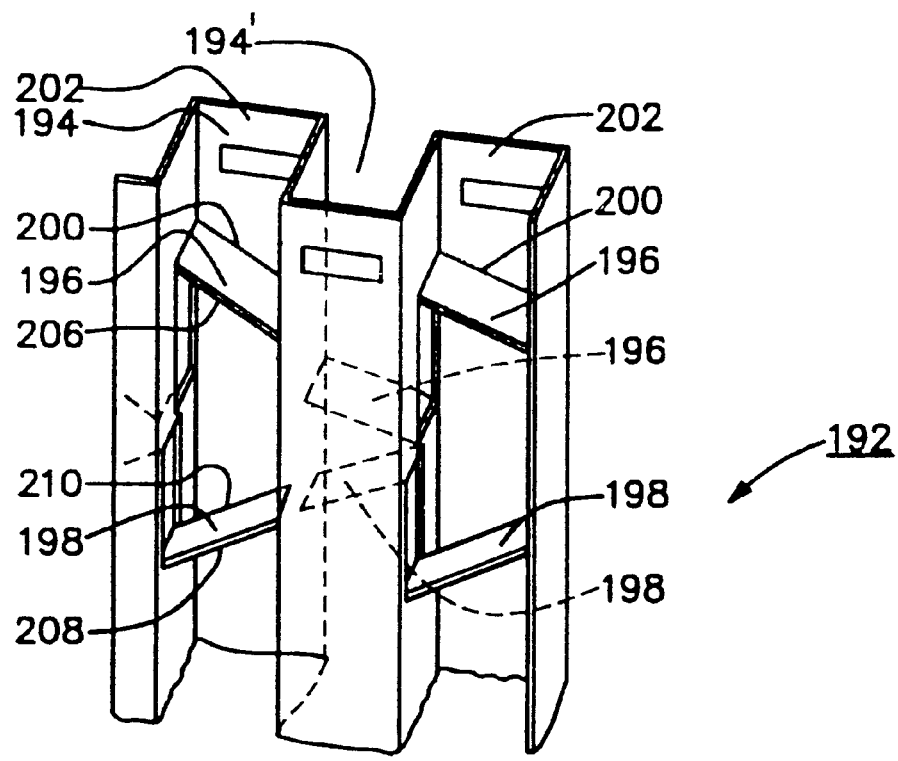
FIG. 12 is a an isometric view of the embodiment of FIG. 11.

In FIGS. 10–12, a further embodiment is illustrated. In this embodiment a packing structure 190 is fabricated from a sheet substrate of the same material as described above for the embodiments of FIGS. 1 and 5. The structure 190 comprises a plurality of identical packing elements 192. A representative element 192 comprises square alternating channels 194, 194' in opposite facing directions as in the prior embodiments.

Vortex generator tabs 196, 198 and so on are in repetitive arrays and are in each channel. The tabs 196 and 198 are preferably identical in peripheral dimensions and are formed from a planar blank sheet of substrate material. The tabs are rectangular in plan view and inclined downwardly from the wall from which they are formed and depend. Tab 196 is formed from and extends from side wall 195. Tab 198 in channel 194 is formed from and extends from side wall 193.

The tabs have a width w preferably greater than one half the channel depth d so as to have a portion 204 which overly one another in the vertical direction along the channel length, FIG. 10.

The tabs 196 have an edge 200 adjacent to connecting wall 202. The tabs 196 have a distal edge 206. Tabs 198 have an edge 208 next adjacent to the connecting wall 207 of the adjacent element 209. The tabs 198 have a distal edge 210. Edges 210 and 206 are spaced from each other when viewed vertically to form portion 204.

The tabs 196 and 198 form openings in the lateral side walls from which they are formed. Openings 211 are formed in the channel connecting walls 210 to provide fluid communication to the channels of adjacent elements such as elements 192 and 209.

It should be understood that the elements may include a greater number of channels and tabs than shown which are a relatively smaller portion of the packing array of elements. The pattern of the tabs may repeat in the manner shown or any other arrangement according to a particular implementation.

Like the other embodiments, no linear vertical fluid path is present in any of the channels. The overlapping tabs provide a tortuous vertical path for the fluids.

While particular embodiments have been described, it is intended that the described embodiments are given by way of illustration rather than limitation. Modifications may be made by one of ordinary skill. The scope of the invention is defined in the appended claims.

What is claimed is:

1. Structured packing element for a fluid processing and mixing tower defining a vertical axis comprising:

a sheet material element having a plurality of channels extending in an axial direction parallel to said vertical axis; and a plurality of vortex generators extending from the sheet material element in each of said channels, said channels exhibiting only a substantially tortuous fluid path formed by said vortex generators in said axial direction;

the channels each having opposing axially extending lateral side walls extending from opposite edges of an intermediate axially extending connecting wall, adjacent channels having a common lateral side wall, the channels each having a corresponding intermediate connecting wall, the connecting walls of the adjacent channels lying in spaced planes to form a quasi-corrugation in a direction transverse to the axial direction of the channels, said vortex generators extending from a common lateral side wall into the adjacent channels;

the lateral side walls lying in planes that are normal to the connecting wall, a first of said vortex generators in each channel extending from a first of said lateral side walls and having a first edge parallel to and adjacent to the connecting wall of that channel for precluding fluid flow therebetween at said first edge and a second edge inclined relative to the first edge and connecting wall and a second vortex generator axially spaced from the first vortex generator and extending from a second lateral side wall with a first edge parallel to and coextensive with a second connecting wall of a next adjacent channel and a second edge inclined relative to its first edge and said connecting wall.

2. The packing element of claim 1 wherein said sheet material element has a plurality of apertures therethrough for permitting fluid in each channel to flow transversely to the axial direction to and from adjacent channels.

3. The packing element of claim 1 wherein the sheet material element is porous and comprises sintered metallic fibers.

4. The packing element of claim 1 wherein said vortex generators are triangular.

5. The packing element of claim 1 wherein the vortex generators include a trapezoidal body segment contiguous with the sheet material element and a non-trapezoidal tip segment extending from the body segment.

6. The packing element of claim 1 wherein the vortex generators are rectangular and the channels are generally square when viewed in a direction along the axial direction.

7. The packing element of claim 3 including a catalytic material attached to said element.

8. The packing element of claim 1 including a further vortex generator ending from a connecting wall into the corresponding channel of that connecting wall wherein vortex generators in a channel are arranged to form only a non-linear continuous fluid flow path along the channel length in the axial direction.

9. The packing element of claim 1 including a plurality of said elements secured together to form an array of like axially extending parallel channels, said array extending transversely the axial direction.

10. The packing element of claim 1 wherein said vortex generators in each channel have a portion thereof overlying one another in the axial direction and together the vortex generators in a channel substantially extend across each channel when viewed in the axial direction so that substantially no linear flow of fluid occurs in the axial direction.

11. Structured packing element for a fluid processing and mixing tower defining a vertical axis comprising:

a sheet material element having a plurality of channels extending in an axial direction parallel to said vertical axis;

a plurality of vortex generators extending from the sheet material element in each of said channels, said channels exhibiting only a substantially tortuous fluid path formed by said vortex generators in said axial direction;

the channels each having opposing axially extending lateral side walls extending from opposite edges of an intermediate axially extending connecting wall, adjacent channels having a common lateral side wall, the channels each having a corresponding intermediate connecting wall, the connecting walls of the adjacent channels lying in spaced planes to form a quasi-corrugation in a direction transverse to the axial direction of the channels, said vortex generators extending from a common lateral side wall into the adjacent channels; and a vortex generator extending from a connecting wall into the corresponding channel wherein the vortex generators in a channel are arranged to form a non-linear continuous fluid flow path along the channel length;

the vortex generators being generally triangular with a tip adjacent to the lateral side wall opposite said common wall for effecting liquid transfer from a region at the tip to the opposite side wall.

12. Structured packing element for a fluid processing and mixing tower defining a vertical axis comprising:

a sheet material element having a plurality of channels extending in an axial direction parallel to said vertical axis;

a plurality of vortex generators extending from the sheet material element in each of said channels, said channels exhibiting only a substantially tortuous fluid path formed by said vortex generators in said axial direction;

said sheet material element having a plurality of apertures therethrough for permitting fluid in each channel to flow transversely to the axial direction to and from adjacent channels; and a plurality of said elements secured to form a two dimensional array of like axially extending parallel channels, said array extending transversely the axial direction, the vortex generators having overlying portions, said generators each having a body portion extending from the sheet material and a tip portion extending from the body portion, said tip portion passing through an aperture.

13. The packing element of claim 12 including a catalytic material attached to said element.

* * * * *

UNITED STATES PATENT AND TRADEMARK OFFICE
CERTIFICATE OF CORRECTION

PATENT NO. : 6,277,340 B1
DATED : August 21, 2001
INVENTOR(S) : Bettina Paikert, Jonathan Lloyd, and Timothy Griffin It is certified that error appears in the above-identified patent and that said Letters Patent is hereby corrected as shown below:

Column 13,
Line 22, change "ending" to "extending"

Signed and Sealed this

Twenty-sixth Day of February, 2002

Attest:

Attesting Officer

JAMES E. ROGAN
Director of the United States Patent and Trademark Office